Oct. 20, 1970 J. F. MARTIN 3,535,700

DIGIT DRIVE CIRCUIT FOR SO-CALLED PLATED WIRE MEMORY

Filed Jan. 22, 1968

INVENTOR
JOSEPH F. MARTIN

BY [signature]

ATTORNEY

United States Patent Office 3,535,700
Patented Oct. 20, 1970

3,535,700
DIGIT DRIVE CIRCUIT FOR SO-CALLED PLATED WIRE MEMORY

Joseph F. Martin, Webster, N.Y., assignor to Stromberg Carlson Corporation, Rochester, N.Y., a corporation of Delaware Filed Jan. 22, 1968, Ser. No. 699,644
Int. Cl. G11c *11/04, 7/02*
U.S. Cl. 340—174 2 Claims

ABSTRACT OF THE DISCLOSURE

Two pairs of back-to-back, parallel connected diodes are connected in series with a bit wire in a plated wire memory, enabling the use of an inexpensive drive amplifier and providing high impedance isolation for the output signals developed in the wire.

BRIEF SUMMARY

Figure 1:
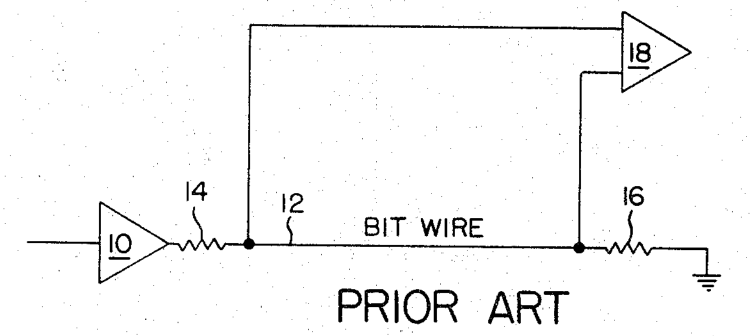
PRIOR ART FIG. 1

This invention relates to a novel circuit arrangement for applying pulses of current to so-called digit, or bit wires in magnetic memory devices of the type currently referred to as plated wire memories.

Filamentary magnetic memory devices appear to be among the most promising of all memory devices so far developed because they provide for non-destructive read-out and are capable of very high speed operation, being limited at present primarily by the speed capabilities of peripheral equipment, and in the current state of the art require only a few hundred nanoseconds to complete a read or a write operation.

Generally, devices of this type are referred to as plated wire memories, and include a planar array of conductive wires, each coated with a thin film, typically about one micron thick, of a magnetic material. See, for example, an article in the Bell Laboratories Record, December 1964, pp. 408–411, vol. 42, No. 11 by U. F. Gianola entitled "Plated Wire Magnetic Film Memories." The magnetic material may be applied as desired, usually by evaporation in vacuuo, or by electroplating, the latter method being presently more widely used. The magnetic film is one having a so-called square loop hysteresis characteristic, and is anisotropic, being applied so as to be difficultly magnetized axially of the supporting wire and easily magnetized circumferentially.

Coils are wound around the wires at spaced points along them for applying magnetic flux in the axial direction, and connections are made to the wires for applying electric current to them to produce circumferential flux. Bits of information are stored in the wires by magnetizing respective incremental lengths of the coatings circumferentially, one direction denoting a binary zero and the opposite direction a binary one. When a momentary pulse of current is passed through a coil around one of the bit increments, the axial magnetic field produced by the current adds a vector in the axial direction, twisting the net magnetization toward the axial direction, and thereby inducing a small voltage pulse in the wire. When the pulse ends in the coil, the axial component of the flux collapses, and the magnetization reverts rapidly to its purely circumferential direction, inducing a second voltage pulse in the wire. The polarity of the second pulse is usually sensed to ascertain the original state of magnetization of the particular bit increment of the wire coating.

To set the direction of magnetization of a particular bit increment, that is, to write a bit of data, a current is maintained in the bit wire in the appropriate direction during the decay of the applied axial field. As the applied axial field decays, the bit increment reverts to purely circumferential magnetization in the direction of the flux produced by the current flowing in the wire.

Substantial currents are usually required in the bit wires for positive writing, yet the output voltages produced by the magnetic action in the coatings are fairly small, typically about five to ten millivolts, and it is highly desirable to isolate the wires from parts of the equipment such as the ground return circuits used for the reading currents, that may induce currents through them. Otherwise, currents induced by stray fields may cause the sense amplifiers to produce spurious output signals. One problem, therefore, has been to isolate the wires with a high impedance between them and other circuit components without unduly impeding the application of writing currents to them. Heretofore, the usual practice has been to connect a resistor in series between each of the wires and the ground return of the amplifier that applies current to it, and to feed current to the wire through an expensive amplifier of relatively high power output, which had to be powerful enough to drive the full current required through the wire in series with the resistor.

A compromise had to be made between the cost of the amplifier and the value of the resistor, and, because of speed requirements, the design of the amplifier imposed restrictions on the value of the resistor, thereby limiting the degree of isolation that could be achieved.

Briefly, the problem is minimized by the present invention, in accordance with which each bit wire in the magnetic memory is terminated at each end with a pair of parallel connected, back-to-back diodes, which provide a very high impedance isolation for the relatively low voltage output signals developed by the wire and against small ambient voltages, and a very low series impedance to the writing signals applied by the amplifier. The use of the back-to-back diodes permits a very sharp reduction in the design requirements and costs of the bit driver amplifier and at the same time provides multimegohms of impedance for isolation of the wires during times when their output signals are to be sensed.

DETAILED DESCRIPTION

Figure 2:
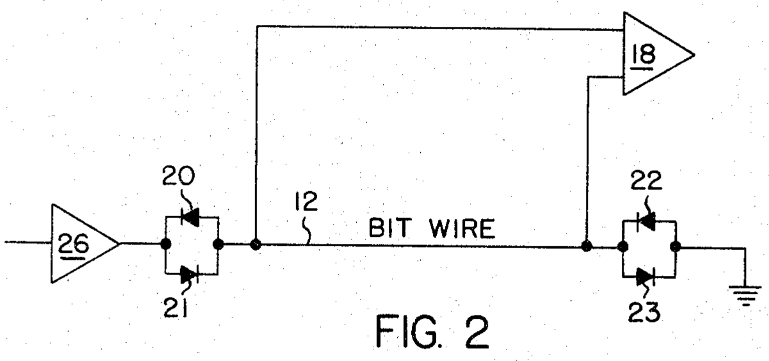
Figure 3:
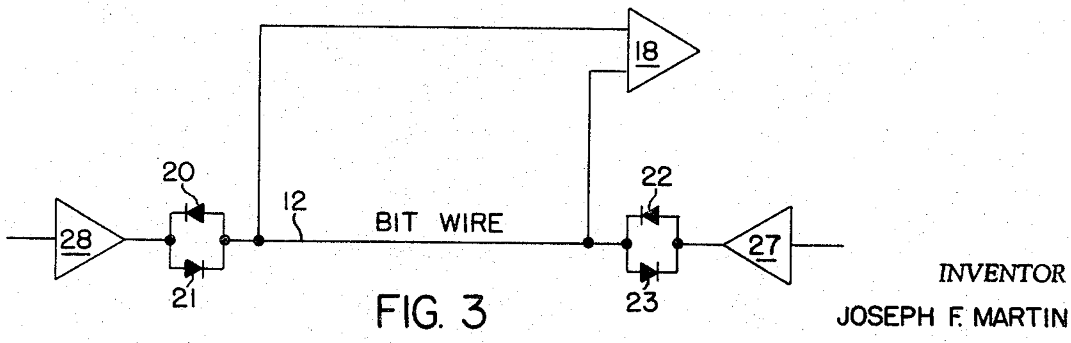

A presently preferred embodiment of the invention will now be described in connection with the accompanying drawing, wherein:

FIG. 1 is a schematic circuit diagram of a typical bit driver and sensing circuit according to the prior art, FIG. 2 is a schematic circuit diagram of a bit driver and sensing circuit according to one embodiment of the invention; and FIG. 3 is a schematic circuit diagram of a bit driver and sensing circuit according to another, and presently preferred embodiment of the invention.

A typical bit driver and sensing circuit of the prior art, as illustrated in FIG. 1, includes an expensive bipolar amplifier 10 capable of providing current pulses having rise times of only a few nanoseconds through a bit wire 12 in series with isolating resistors 14 and 16, one resistor connected at each end of the wire 12. The current pulses must be, typically, between about 50 ma. and 100 ma., and, if the resistors 14 and 16 are of substantial value, the amplifier 10 must be of impractically high power. Consequently, the resistors 14 and 16 are usually selected to be of relatively small value, about fifty to one hundred ohms each, to reduce the power requirement of the amplifier to a reasonably achievable value.

The output voltages developed by the magnetic action are applied to a balanced differential amplifier 18 called the sense amplifier. Because the output voltages are of small magnitude, the amplifier 18 must be highly sensitive, and it may occasionally respond to currents induced in the wire due to momentary differences in the potentials at the grounded terminals of the resistors 14 and 16.

In accordance with the invention as illustrated in FIG. 2, the bit wire 12 is terminated with back-to-back, parallel connected diode pairs 20 and 21, and 22 and 23, respectively, which isolate the wire 12 from the balance of the circuit with respect to disturbances of low voltage, providing several megohoms of effective resistance to voltages of less than about one-half volt. When the diodes 20–23 are driven (one of each pair at any one time) into conduction by operation of the drive amplifier 26, their resistance drops to a very low value, typically in the range of five to ten ohms. The amplifier 26, therefore, may be a relatively inexpensive one having only limited power output capability.

Integrated circuit amplifiers are among the least expensive amplifiers presently available, and it is expected that amplifiers of this type having bipolar output capabilities will become available in the future. Currently, however, all integrated circuit amplifiers available commercially are limited to unipolar outputs. It has been found to be less expensive to use two unipolar, integrated circuit amplifiers, 27 and 28, respectively, one at each end of the bit wire 12, as shown in FIG. 3, then to use a single, bipolar amplifier, as shown in FIG. 2, composed of discrete circuit components. The arrangement shown in FIG. 3, therefore, is the presently preferred embodiment of the invention, and it is expected that the arrangement shown in FIG. 2 will become the preferred embodiment when inexpensive, integrated circuits become available capable of selectively producing both positive and negative output signals.

What is claimed is:

1. A bit wire drive and sense circuit for a plated wire magnetic memory comprising a bit wire, a first pair of oppositely poled diodes permanently connected in parallel with each other and in series with said bit wire at one end thereof, a second pair of oppositely poled diodes permanently connected in parallel with each other and in series with said bit wire at the opposite end thereof, amplifier means connected to apply current pulses to said wire through said diodes, and a sense amplifier connected between opposite ends of said wire at points between said wire and said pairs of diodes.

2. A bit wire drive and sense circuit in accordance with claim 1, wherein said amplifier means includes two unipolar amplifiers connected at opposite respective ends of said bit wire, with said first diode pair between one of said amplifiers and said bit wire and with said second diode pair between the other of said amplifiers and said bit wire.

References Cited

UNITED STATES PATENTS

| | | | |
|---|---|---|---|
| 3,267,446 | 8/1966 | Woods et al. | 340—174 |
| 3,380,038 | 4/1968 | Cohler | 340—174 |

STANLEY M. URYNOWICZ, Jr., Primary Examiner